United States Patent
Kohler

(10) Patent No.: US 7,448,195 B2
(45) Date of Patent: Nov. 11, 2008

(54) LAWN MOWER ATTACHMENT FOR CONTROLLING DISCHARGE FLOW

(76) Inventor: Gary C. Kohler, 7880 Hampton Way, Owings, MD (US) 20736

( * ) Notice: Subject to any disclaimer, the term of this patent is extended or adjusted under 35 U.S.C. 154(b) by 0 days.

(21) Appl. No.: 11/882,673

(22) Filed: Aug. 3, 2007

(65) Prior Publication Data

US 2008/0134654 A1 Jun. 12, 2008

Related U.S. Application Data

(60) Provisional application No. 60/873,574, filed on Dec. 8, 2006.

(51) Int. Cl.
*A01D 67/00* (2006.01)
(52) U.S. Cl. .................................. 56/320.2
(58) Field of Classification Search ............. 56/320.2, 56/202, 320.1, 17.4
See application file for complete search history.

(56) References Cited

U.S. PATENT DOCUMENTS

| | | | |
|---|---|---|---|
| 2,578,880 A | 12/1951 | Doyle | |
| 3,192,692 A * | 7/1965 | Slemmons | 56/13.4 |
| 3,404,519 A | 10/1968 | Demers | |
| 3,496,707 A * | 2/1970 | Kobey | 56/17.5 |
| 3,949,540 A * | 4/1976 | Christopherson et al. | 56/202 |
| 4,107,907 A * | 8/1978 | Rutherford | 56/320.2 |
| 4,226,074 A | 10/1980 | Mullet et al. | |
| 4,466,235 A | 8/1984 | Cole | |
| 4,800,712 A * | 1/1989 | Morse et al. | 56/202 |
| 4,854,115 A * | 8/1989 | Jones et al. | 56/320.1 |
| 5,040,364 A | 8/1991 | Deegan | |
| 5,107,566 A | 4/1992 | Schmid | |
| 5,133,175 A | 7/1992 | Dumbrell | |
| 5,251,430 A | 10/1993 | Matsumoto et al. | |
| 5,491,964 A | 2/1996 | Butler | |
| 5,826,417 A | 10/1998 | Evans | |
| 6,347,503 B1 * | 2/2002 | Esau et al. | 56/15.9 |
| 6,609,358 B1 | 8/2003 | Schmidt et al. | |
| 6,751,937 B2 | 6/2004 | Kobayashi et al. | |
| 6,854,253 B2 | 2/2005 | Dickey | |
| 6,857,256 B2 | 2/2005 | Strange et al. | |
| 6,862,875 B2 | 3/2005 | Iida et al. | |
| 6,874,309 B1 | 4/2005 | Bellis, Jr. | |
| 6,910,322 B2 * | 6/2005 | Schroeder et al. | 56/202 |
| 7,093,415 B2 | 8/2006 | Kallevig et al. | |
| 7,185,479 B1 * | 3/2007 | Cartner | 56/320.1 |
| 7,313,902 B1 * | 1/2008 | Eavenson et al. | 56/13.6 |
| 7,337,602 B1 * | 3/2008 | Butler et al. | 56/320.2 |
| 2004/0237493 A1 * | 12/2004 | Schroeder et al. | 56/320.2 |

* cited by examiner

*Primary Examiner*—Árpád Fábián-Kovács
(74) *Attorney, Agent, or Firm*—William C. Schrot; Berenato, White & Stavish, LLC

(57) ABSTRACT

A lawn mower attachment for controlling lateral discharge of clippings expelled from a discharge chute of a mover is disclosed. The attachment includes a flap pivotably attached to the discharge chute, a control bracket secured to an exterior surface of the lawn mower, and a rod. A first end of the rod is secured to the flap, and a free second end of the rod extends outwardly from the control bracket. The rod extends through and is slideably disposed within a channel in the control bracket. Movement of the second end away from the control bracket pivots a distal edge of the flap away from the discharge chute, while movement of the second end toward the control bracket pivots the distal edge of the flap toward the discharge chute.

21 Claims, 10 Drawing Sheets

LAWN MOWER ATTACHMENT FOR CONTROLLING DISCHARGE FLOW

CROSS REFERENCE TO RELATED APPLICATION AND CLAIM TO PRIORITY

This application is based on provisional application Ser. No. 60/873,574, filed Dec. 8, 2006, for Gary C. Kohler, the disclosure of which is incorporated herein by reference and to which priority is claimed under 35 U.S.C. §119(e).

FIELD OF THE INVENTION

A lawn mower attachment for controlling lateral discharge of clippings expelled from a discharge chute of a mover is disclosed. The attachment includes a flap pivotably attached to the discharge chute, a control bracket secured to an exterior surface of the lawn mower, and a rod. A first end of the rod is secured to the flap, and a free second end of the rod extends outwardly from the control bracket. The rod extends through and is slideably disposed within a channel in the control bracket. Movement of the second end away from the control bracket pivots a distal edge of the flap away from the discharge chute, while movement of the second end toward the control bracket pivots the distal edge of the flap toward the discharge chute.

BACKGROUND OF THE INVENTION

Conventional lawnmowers, including walk-behind and riding mowers, include a mower deck having one or more rotary cutting blades disposed therein. Grass clippings may be discharged out of one side of the mower deck via a discharge chute. If a mulching deck is provided, grass clippings may be re-cut into finer particles and then discharged directly down to the ground. Many conventional mowers may be converted from a side discharge mower to a mulching mower, and vice versa, by changing baffles provided on the deck and the type of blade.

Some conventional mower designs provide for flow control through mulching baffles that are attached to the underside of the mower deck. Mulching baffles maintain the clippings cut by the blade within an enclosed area around the blade so that the clippings are re-cut by the blade. However, installation or removal of such mulching baffles and mulching blades is time-consuming and labor intensive. Further, mulching baffles function to control the movement of air and clippings within the mower deck, as opposed to controlling lateral discharge of clippings from the discharge chute.

Other mower designs provide for a mulch plate or plug which covers the discharge chute. Some conventional mulch plates are bolted onto the discharge chute, thereby shielding the chute to redirect grass clippings back into the deck housing for recirculation. Other designs provide for a mulch plug which is inserted into the discharge chute. While such plugs may be more easily removed than other designs, the chute is completely blocked by the plug given the function of the plate or plug is to prohibit clippings from being discharged from the chute.

Still other mower designs include a moveable guide plate which may be pivoted into a first position for directing clippings out of the discharge chute, and a second position for directing clippings into an associated mower bag or other such receptacle. Such mower designs may be more easily switched from a side discharge mower to a mulching mower compared to other conventional mower designs. However, such designs fail to provide any control of lateral discharge of the clippings. Moreover, many such designs, in addition to the guide plate, also require a plug in the discharge chute when in the mulching mode.

Therefore, there is a need to provide a lawn mower attachment for controlling lateral discharge of clippings expelled from a discharge chute of mower, which may be easily adjusted by the operator. Further, there is a need for a lawn mower attachment that overcomes some or all of the above-noted problems.

SUMMARY OF THE INVENTION

The present invention is directed to a lawn mower attachment for controlling lateral discharge of clippings expelled from a discharge chute of a mower. The attachment includes a flap pivotably attached to the discharge chute, a control bracket secured to an exterior surface of the lawn mower, and a rod. A first end of the rod is secured to the flap, and a free second end of the rod extends outwardly from the control bracket. The rod extends through and is slideably disposed within a channel in the control bracket. Movement of the second end away from the control bracket pivots a distal edge of the flap away from the discharge chute, while movement of the second end toward the control bracket pivots the distal edge of the flap toward the discharge chute.

A lawn mower attachment according to another embodiment includes a flap pivotably attached to a discharge chute of a lawn mower. A control bracket having a slot is secured to an exterior surface of the lawn mower. A control handle has a portion disposed and linearly moveable within the slot. A cable has a first end secured to the flap and a second end secured to the control handle. Linear movement of the control handle in a first direction pivots a distal edge of the flap away from the discharge chute, and linear movement of the control handle in an opposite second direction pivots the distal edge of the flap toward the discharge chute.

A lawn mower attachment according to another embodiment includes a flap pivotably attached to a discharge chute of a lawn mower. A support bracket is secured to the exterior surface of the lawn mower intermediate the control bracket and the flap. The support bracket has an opening. A rod has a first end secured to the flap and a free second end. The rod extends through and is slideably disposed within the opening so that the second end is moveable toward and away from the opening. Movement of the second end away from the opening pivots a distal edge of the flap away from the discharge chute, and movement of the second end toward the opening pivots the distal edge of the flap toward the discharge chute.

DETAILED DESCRIPTION OF PREFERRED EMBODIMENTS

Figure 1:
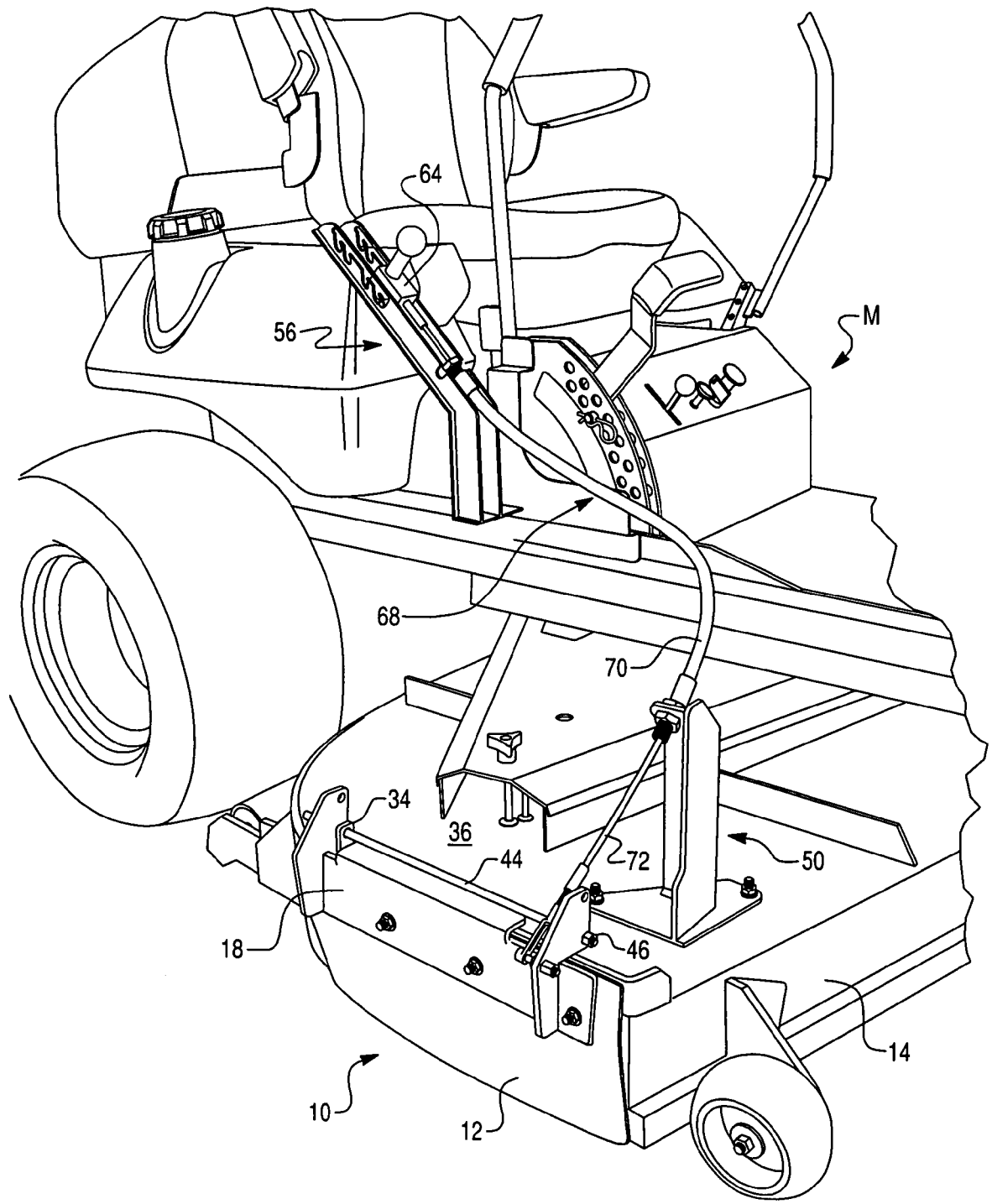
FIG. 1 is a fragmentary perspective view of a lawn mower and a mower attachment according to the present invention.
Figure 2:
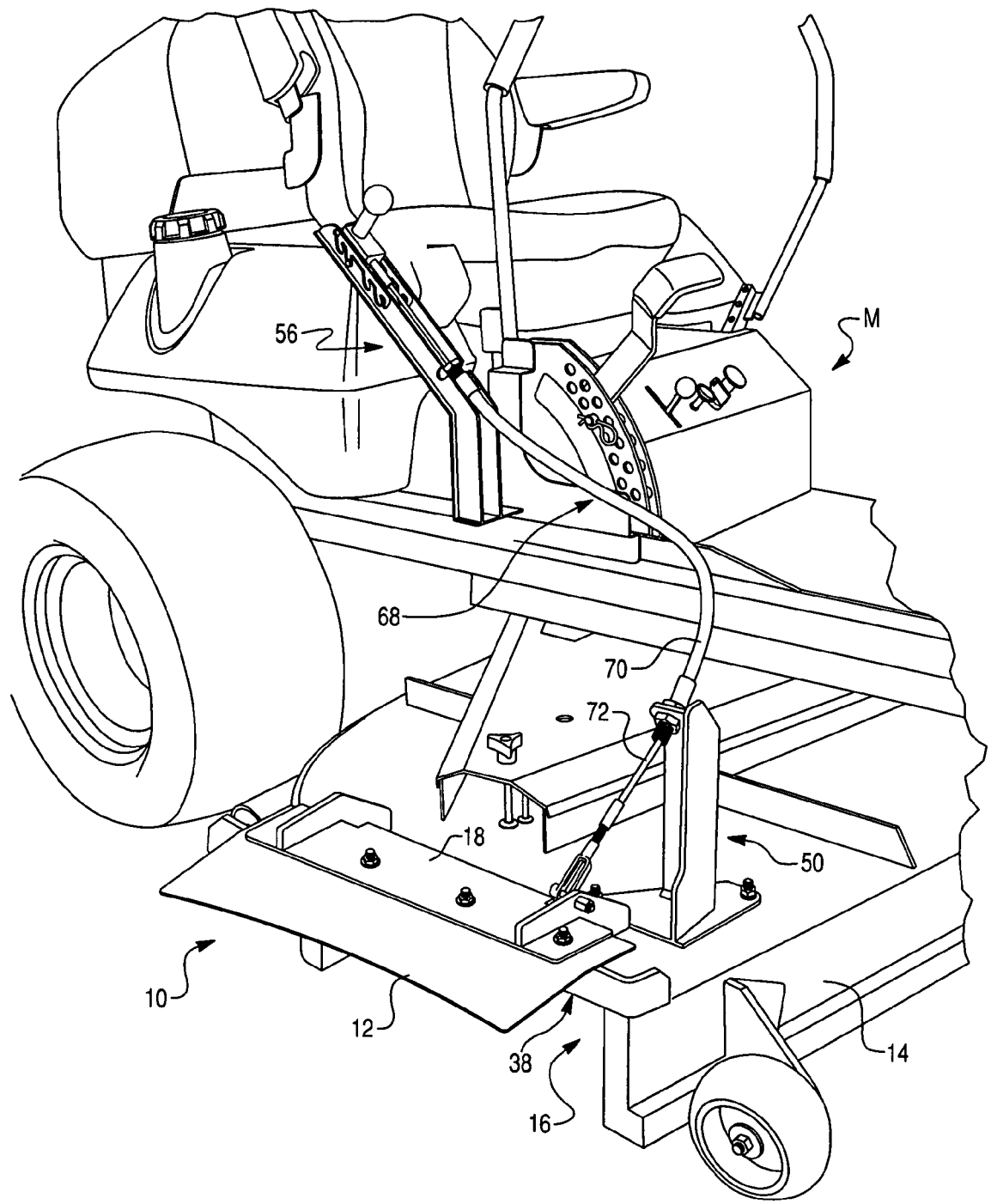
FIG. 2 is a fragmentary perspective view of the lawn mower and the mower attachment of FIG. 1 showing the attachment in another orientation.
Figure 3:
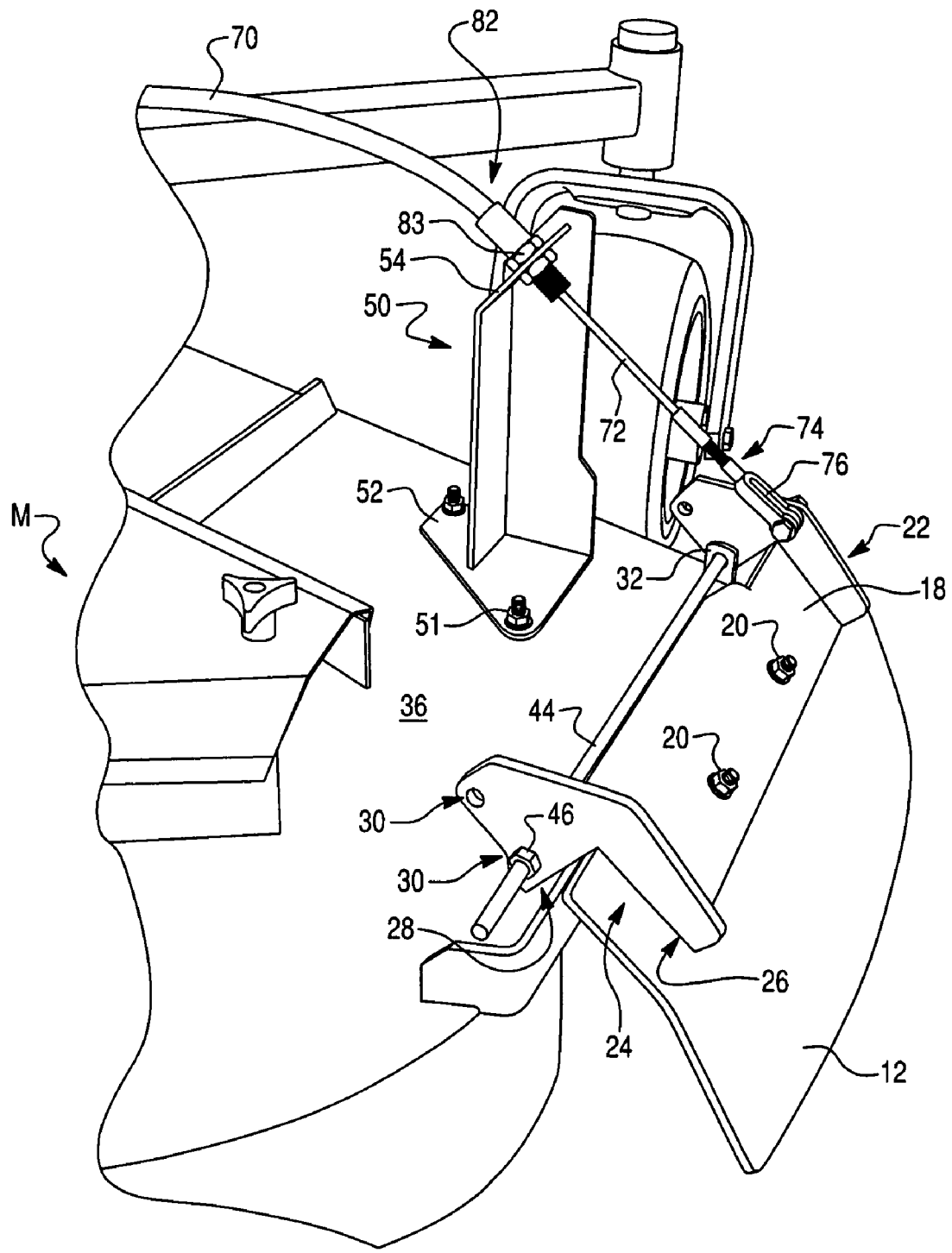
FIG. 3 is a fragmentary perspective view showing a portion of the mower attachment of FIG. 1.

A lawn mower attachment 10 for controlling lateral discharge of clippings expelled from a discharge chute of a lawn mower M according to an embodiment of the present invention is best shown in FIGS. 1 and 2. Attachment 10 includes a flap 12 pivotally attached to a deck 14 of mower M proximate a discharge chute 16 thereof. As best shown in FIGS. 1-3, a support plate 18 may be secured to a longitudinal edge of flap 12 via associated fasteners 20. Support plate 18 may include first and second flanges 22, 24 extending outwardly proximate opposite ends thereof. Each of flanges 22, 24 has a generally L-shaped inner edge having a first portion 26 proximate flap 12, and a second portion 28 proximate deck 14. Second portion 28 preferably includes one or more openings 30.

First and second spaced deck brackets 32, 34 are provided on mower M, which extend outwardly and upwardly from an upper surface 36 of deck 14. Each of deck brackets 32, 34 is proximate a corresponding end of an upper edge 38 of deck 14 defining discharge chute 16. Deck brackets 32, 34 include axially aligned holes. Support plate 18 is positioned adjacent upper edge 38 such that one of openings 30 from each of second portions 28 is axially aligned with the holes in deck brackets 32, 34. A rod 44 extends through axially aligned openings 30 and hole in deck brackets 32, 34, such that support plate 18 and therefore flap 12 is pivotally secured to deck 14. Retaining nuts 46 may be provided on opposite ends of rod 44.

Figure 4:
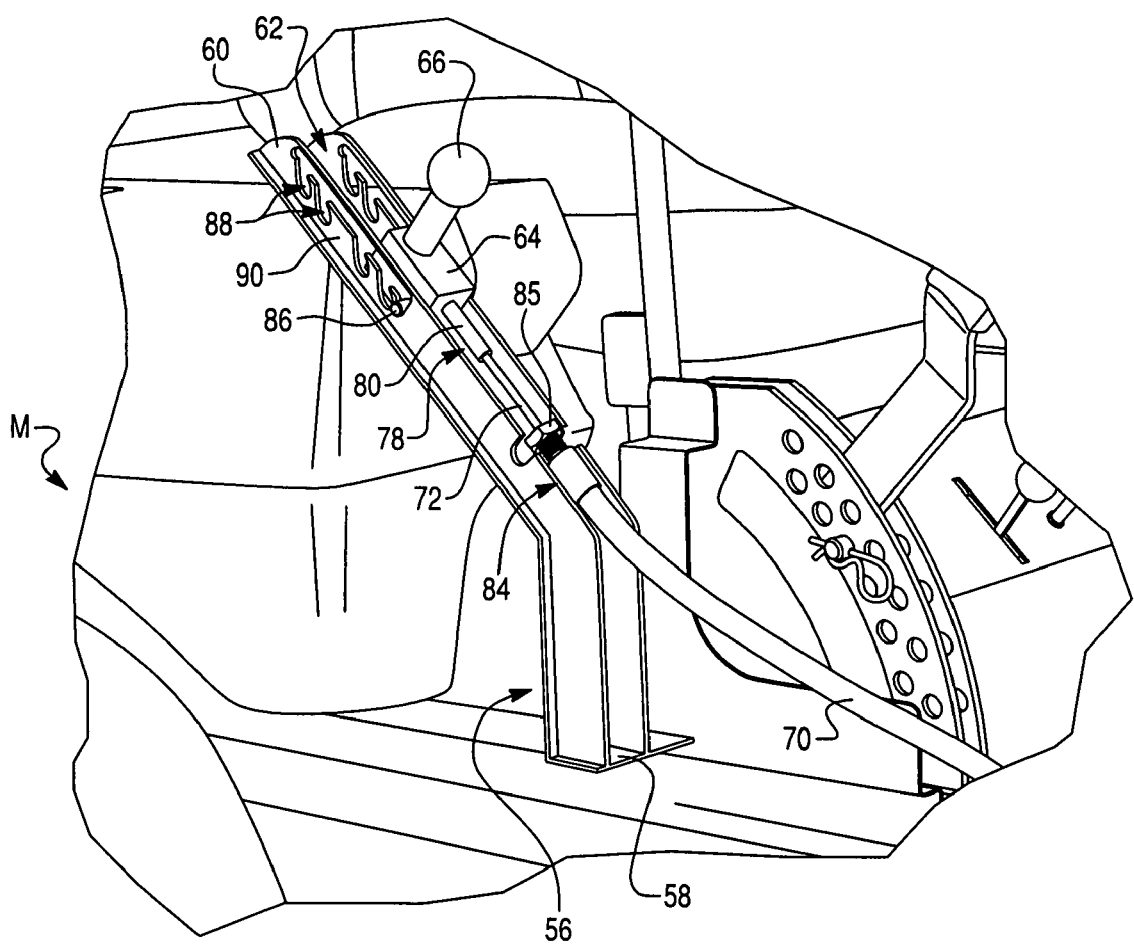
FIG. 4 is a fragmentary perspective view showing another portion of the mower attachment of FIG. 1.

As best shown in FIG. 3, a cable support bracket 50 may be provided, which includes a first end 52 secured to upper surface 36 of deck 14 via associated fasteners 51, and a second distal end 54. As best shown in FIG. 4, a control handle support bracket 56 may be provided, which includes a first end 58 secured to mower M and a second distal end 60 preferably within reach of an operator. Control handle support bracket 56 preferably includes an upper portion proximate second distal end 60 having a U-shaped configuration which forms a channel 62. A control block 64 is moveably disposed within channel 62. Preferably a control handle 66 is attached to an upper surface of control block 64, so that the user may easily grip handle 66 and linearly move control block 64 within channel 62.

Referring again to FIGS. 1 and 2, control block 64 is coupled to support plate 18 via a cable assembly 68. Preferably, cable assembly 68 includes a flexible outer sheath 70 and an axially movable inner cable 72 disposed within sheath 70. As best shown in FIG. 3, inner cable 72 includes a first end 74 secured to support plate 18. First end 74 of inner cable 72 may be secured to one of flanges 22 or 24 via an associated fastener or bracket, such as a Y-shaped bracket 76. As best shown in FIG. 4, inner cable 72 includes a second end 78 secured to block 64 via an associated retaining dowel 80 extending outwardly from block 64.

A first end 82 of flexible outer sheath 70 may be secured to distal end 54 of cable support bracket 50 via an associated fastener and nuts 83, as shown in FIG. 3. A second end 84 of flexible outer sheath 70 is preferably secured to control handle support bracket 56 via an associated fastener and nut 85 proximate a lowermost portion of channel 62, as shown in FIG. 4. As such, ends 82, 84 of flexible outer sheath 70 are retained in a fixed position. As shown in FIGS. 1 and 2, the length of inner cable 72 is greater than the length of flexible outer sheath 70, such that ends 74, 78 of inner cable 72 extend outwardly from ends 82, 84 of flexible outer sheath 70.

Linear movement of control block 64 within channel 62 in a first direction away from second end 84 of flexible outer sheath 70 pulls first end 74 of inner cable 72 toward first end 82 of flexible outer sheath 70. Thus, inner cable 72 axially slides within flexible outer sheath 70 and first end 74 is moved toward cable support bracket 50, thereby causing support plate 18 to pivot away from discharge chute 16 so that flap 12 is in an open position, as best shown in FIG. 2.

Linear movement of control block 64 within channel 62 in a second direction opposite the first direction, and toward second end 84 of flexible outer sheath 70, pushes first end 74 of inner cable 72 away from first end 82 of flexible outer sheath 70. Thus, inner cable 72 axially slides within flexible outer sheath 70 and first end 74 is moved away from cable support bracket 50, thereby causing support plate 18 to pivot toward discharge chute 14 so that flap 12 is in a closed position, as best shown in FIG. 1.

Preferably, when flap 12 is in a fully closed position as shown in FIG. 1, control block 64 is disposed in a lowermost portion of channel 62. As control block 64 is moved within channel 62 in the first direction away from second end 84 of flexible outer sheath 70, inner cable 72 pulls support plate 18 and thus pivots a distal edge of flap 12 away from discharge chute 16.

As best shown in FIG. 4, control block 64 may include first and second shafts 86 extending outwardly from opposite sides of control block 64, and receivable in corresponding notches 88 provided on sidewalls 90 of control handle support bracket 56 and adjacent channel 62. Shafts 86 may be removeably retained within corresponding notches 88, so that flap 12 is disposed at a selected angle relative to discharge chute 16.

Movement of control block 64 within channel 62 in the second direction causes inner cable 72 to pivot the distal edge of flap 12 toward discharge chute 16, as described above. Thus, the position of control block 64 within channel 62 may be selected by the user, thereby selecting the angle at which flap 12 extends from discharge chute 16. In this way, flap 12 may be in an open position as shown in FIG. 2, a fully closed position as shown in FIG. 1, or any position therebetween. Further, support plate 18 may be configured such that flap 12 pivots upwardly further than shown in FIG. 2. For example, it may be desirable for some applications to permit flap 12 to pivot upwardly 180° or more.

Thus, attachment 10 allows the user to selectively switch between a mulching mode when flap 12 is in a fully closed position, and discharging mode when flap 12 is in a fully open position. In addition, the user may selectively adjust the lateral distance that the clippings are discharged from discharge chute 14. For example, the user may want clippings to be expelled a maximum lateral distance from deck 14, in which case flap 12 is pivoted to the fully open position.

However, the user may need to reduce the lateral distance that clippings are expelled from discharge chute 16, without having flap 12 completely blocking discharge chute 16. For example, if the user is mowing an area which is close to a flower bed or fence, the user may want to discharge clippings from discharge chute 16, but without expelling the clippings so far as to land within the flower bed or on the fence. In such a case, the user may move control block 64 to a selected position in a central portion of channel 62. Inner cable 72 pulls (or pushes) support plate 18 to a corresponding position such that flap 12 is disposed in a position intermediate the fully open and fully closed positions, as shown in FIG. 3. Grass clippings and other debris are thrown from discharge chute 16, but are deflected downwardly by flap 12, thereby reducing the lateral distance clippings are expelled from discharge chute 16.

The user may easily select the angle at which flap 12 extends from discharge chute 16 by simply sliding control handle 66, which is attached to control block 64, in either the first direction or the second direction. The control block 64 may then be maintained in a selected position via alignment of shafts 86 within corresponding notches 88.

Figure 5:
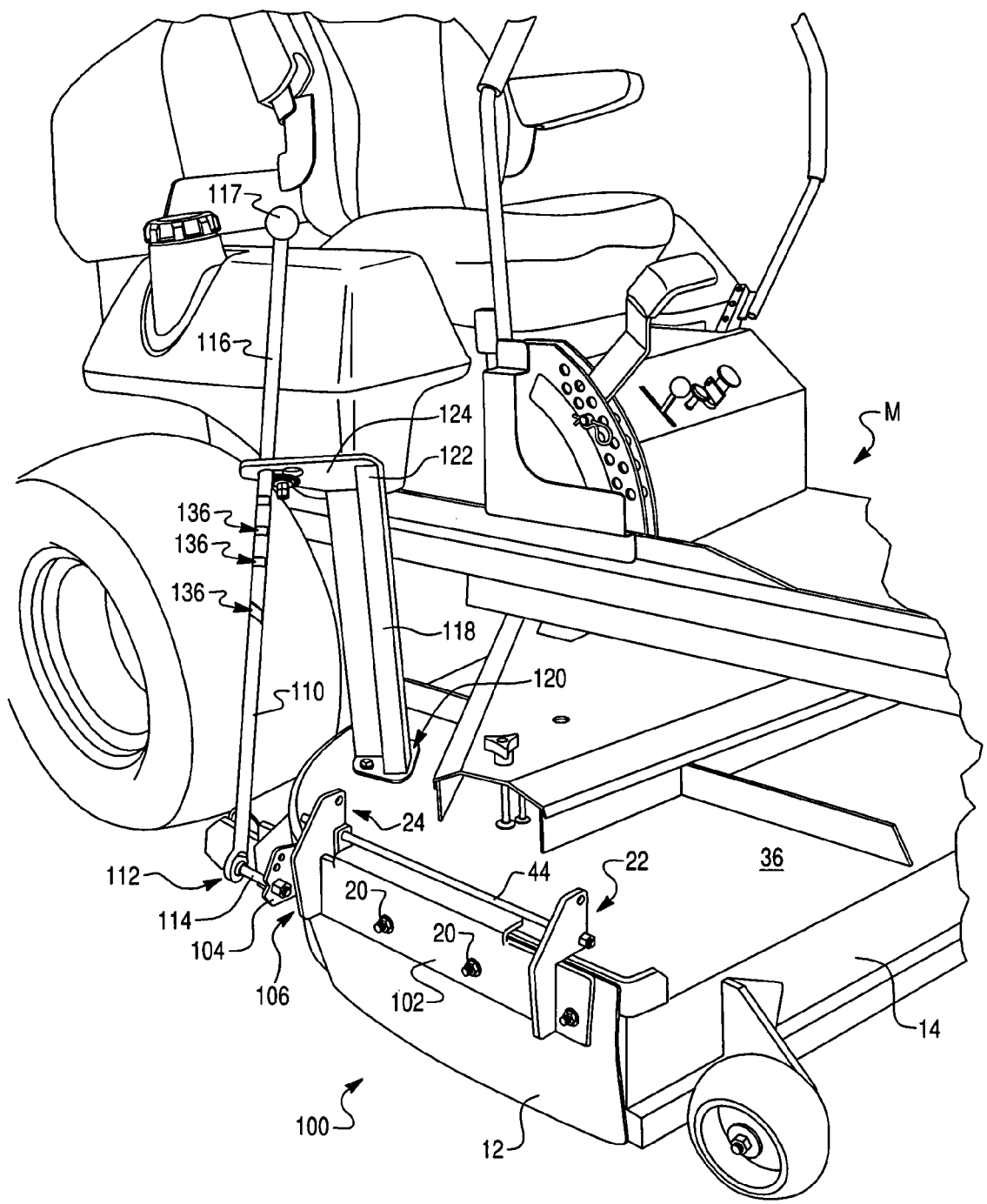
FIG. 5 is a fragmentary perspective view of a lawn mower and a mower attachment according to another embodiment.

A lawn mower attachment 100 for controlling lateral discharge of clippings expelled from a discharge chute of lawn mower M according to another embodiment is best shown in FIG. 5. Components of attachment 100 which are identical to components of attachment 10 are identified with like reference numerals, and the description of same will not be repeated hereafter.

Attachment 100 includes flap 12 and a support plate 102 which is attached to a longitudinal edge of flap 12. Support plate 102 includes first and second flanges 22, 24 extending outwardly proximate opposite ends thereof, and support plate 102 is pivotally attached to upper surface 36 of deck 14 as described above.

Thus, support plate 102 is similar to support plate 18. However, support plate 102 includes an end bracket 104 disposed proximate an end 106 thereof. End bracket 104 preferably extends outwardly from support plate 102 on a plane substantially perpendicular to the plane of flap 12.

Pivotal movement of flap 12 is controlled via axial movement of a control rod 110. Control rod 110 includes a first end 112 coupled to end bracket 104. Preferably, first end 112 has a socket configuration. A pin 114 includes a first end secured to end bracket 104, such as through a corresponding hole in end bracket 104 and with associated fasteners. Pin 114 includes a second end having a ball configuration which is rotatably retained within the socket configuration of first end 112. In this way, first end 112 is coupled to end bracket 104 via a ball and socket joint, thereby allowing limited rotational movement of pin 114 relative to control rod 110.

Control rod 110 includes an opposite second end 116 preferably disposed proximate the user, so that the user may easily grip second end 116 while operating lawn mower M. A ball 117 may be provided on second end 116 which acts as a handle.

Figure 6:
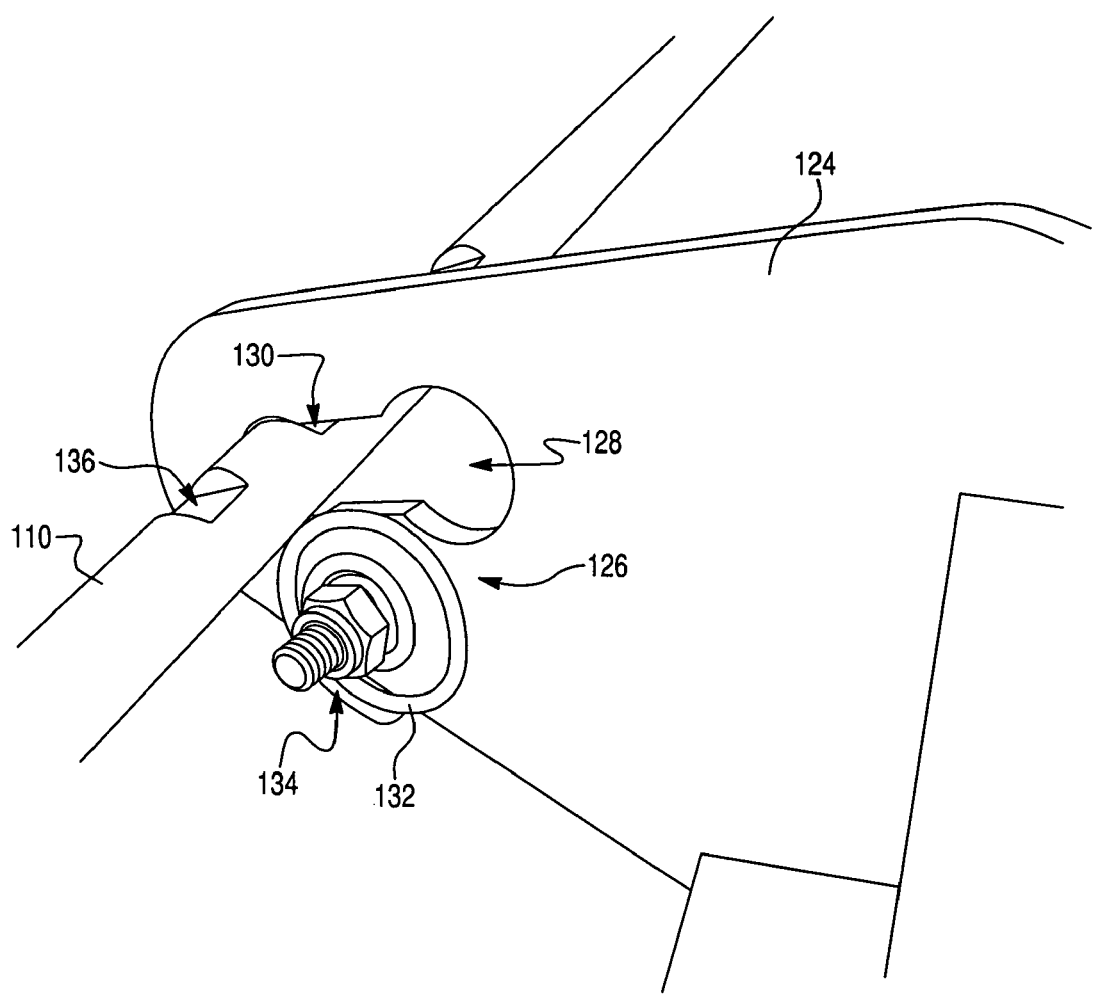
FIG. 6 is a fragmentary perspective view of a portion of the mower attachment of FIG. 5.

Attachment 100 includes control rod support bracket 118. Control rod support bracket 118 includes a first end 120 secured to upper surface 36 of deck 14 and a second distal end 122. Second distal end 122 includes a control plate 124 having an opening 126 through which control rod 110 extends, as best shown in FIG. 6. Preferably, opening 126 has a keyhole configuration. Thus, a first portion 128 of opening 126 has a first diameter, and a second portion 130 of opening 126 has a second diameter less than the first diameter.

A coil 132 is provided proximate and partially extending into second portion 130 of opening 126. Coil 132 may be secured to either an underside or upper surface of control plate 124 via an associated fastener, such as a nut and bolt 134. Coil 132 is tensioned against control rod 110 when control rod is disposed in second portion 130.

Control rod 110 includes a plurality of notches 136, as shown in FIGS. 5 and 6. Control rod 110 may be axially moved upwardly or downwardly relative to control plate 124 when control rod 110 is disposed within first portion 128 of opening 126. As control rod 110 is pulled upwardly, first end 112 is lifted upwardly thereby pulling end bracket 104 upwardly. In this way, support plate 102 and thus flap 12 is pivoted to an open position. As end bracket 104 on support plate 102 is pivoted to an open position, the connection point between pin 114 and end bracket 104 proceeds along an arcuate path. The ball and socket coupling between first end 112 and end bracket 104 via pin 114 account for this arcuate motion, thereby permitting upward movement of control rod 110 to translate into pivotal movement of support plate 102.

Control rod 110 may be maintained in an axially selected position. Control rod 110 may be axially moved upwardly or downwardly relative to control plate 124 when the user pulls or pushes ball 117 away from or toward control plate 124 when control rod 110 is disposed within first portion 128 of opening 126. Upward movement of control rod 110 causes flap 12 to open. The user may pull ball 117 and thus axially move control rod 110 a sufficient distance so that flap 12 is pivoted to a fully open position. When flap 12 is in the fully open position, a lowermost notch 136 is disposed within opening 126 such that the lowermost notch 136 is aligned with second portion 130 of opening 126. The user may then pivot control rod 110 into second portion 130, such that the lowermost notch 136 is disposed within second portion 130. Control rod 110 is pushed against and past coil 132 as it proceeds into second portion 130. Control rod 10 is tensionably maintained within second portion 130 due to coil 132, thereby maintaining control rod 110 at the axially selected position. The ball and socket coupling between control rod 110 and end bracket 104 permits pivotal movement of control rod 110 as it is moved between first portion 128 and second portion 130.

Control rod 110 may be releaseably maintained in other selected axial positions by aligning other notches 136 on control rod 110 with second portion 130 of opening 126. In this way, the user may releaseably lock control rod 110 in an axially selected position by moving control rod 110 upwardly or downwardly until a desired notch 136 is aligned with second portion 130 of opening 126, and then pivoting control rod 110 into second portion 130 thereby releaseably locking control rod 110 in the desired position. For example, the second to lowermost notch 136 on control rod 110 may be releaseably locked in second portion 130, as shown in FIG. 6.

As the user pulls control rod 110 upwardly, the angle of control rod 110 relative to support plate 124 varies slightly. When control rod 110 is pulled upwardly such that flap is fully open, it may be desirable to have one or more notches 136 angularly disposed relative to the axis of control rod 110, particularly the lowermost notch 136 such as shown in FIG. 5. For example, the lowermost notch 136 may be angularly disposed, and provided such that control rod 110 may be easily pivoted into second portion 130 when flap 12 is in a fully open position. Flap 12 may be pivotable 90° or more relative to the plane of discharge chute 16, more preferably about 180°.

Similarly, downward movement of control rod 110 causes flap 12 to close. The user may push ball 117 and thus axially move control rod 110 until flap 12 is pivoted to a fully closed position. Due to the weight of support plate 102, flap 12, and control rod 110, gravitational forces bias control rod 110 downwardly. Thus, flap 12 is biased toward a fully closed position unless control rod 110 is releaseably locked in a selected position as described above.

As with attachment 10, attachment 100 allows the user to selectively switch between a mulching mode when flap 12 is in a fully closed position, and discharging mode when flap 12 is in a fully open position. In addition, the user may selectively adjust the lateral distance that the clippings are discharged from discharge chute 16 by adjusting the angle at which flap 12 is disposed relative to discharge chute 16.

Figure 7:
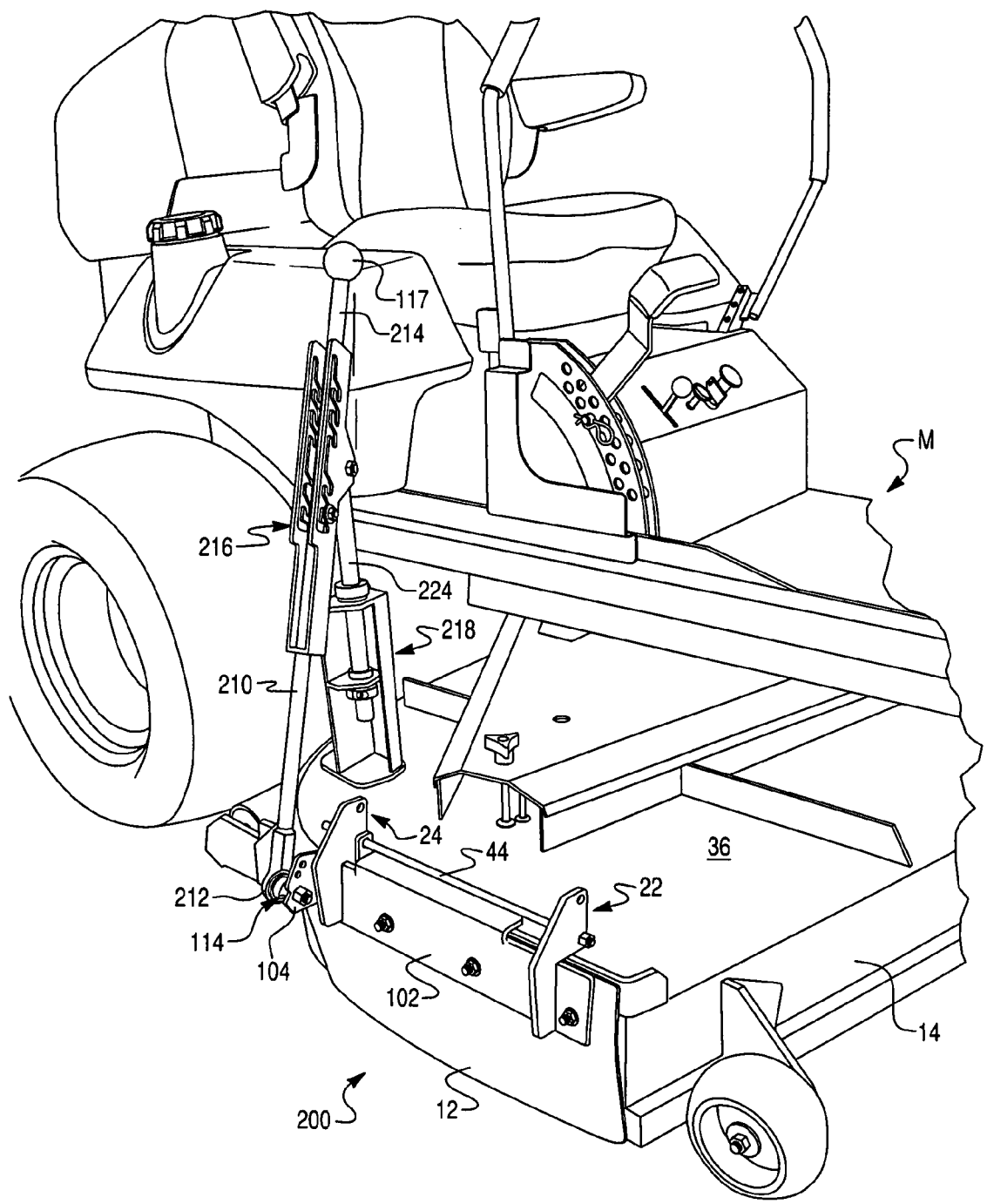
FIG. 7 is a fragmentary perspective view of a lawn mower and a mower attachment according to another embodiment.
Figure 8:
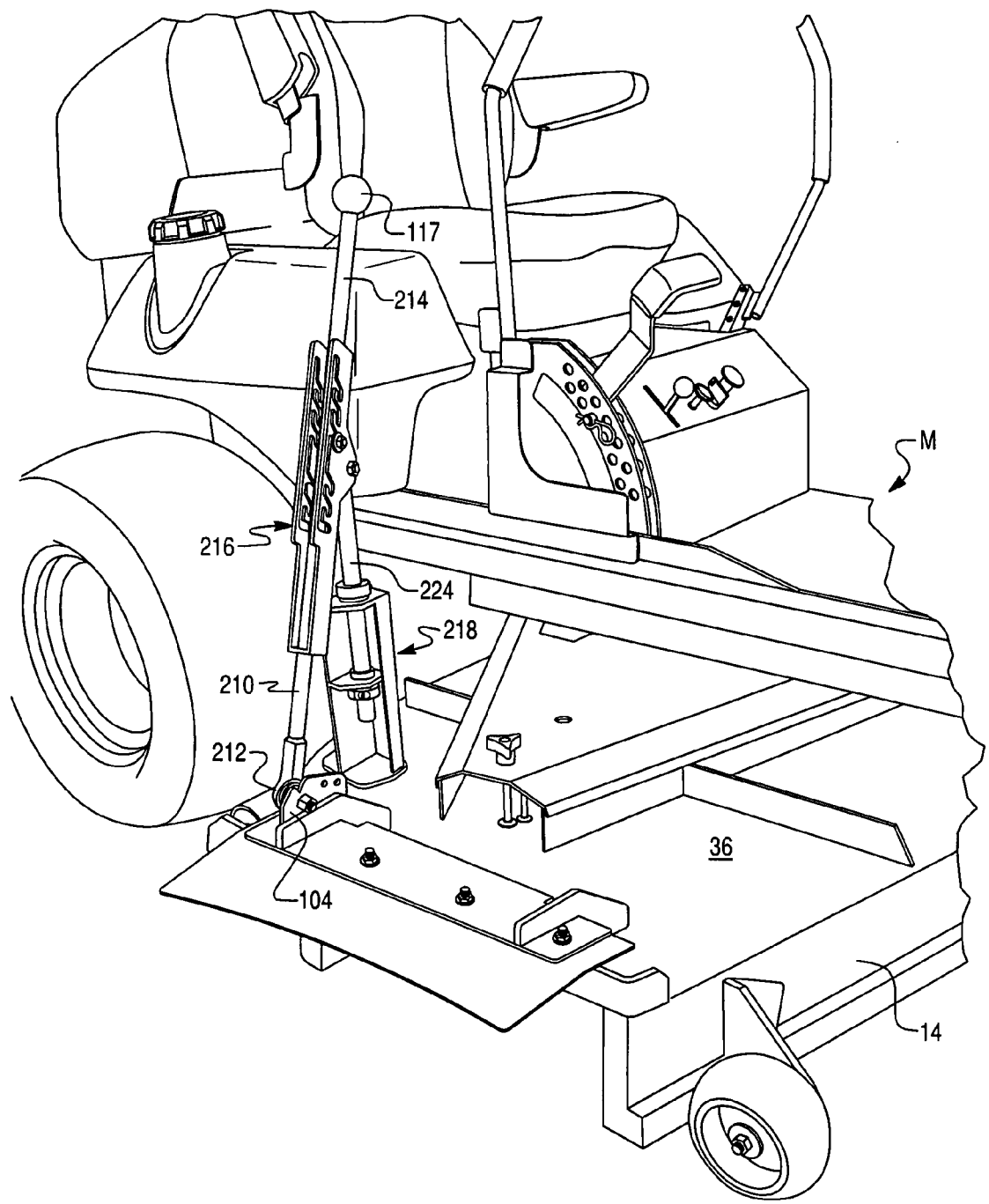
FIG. 8 is a fragmentary perspective view of the lawn mower and the mower attachment of FIG. 7 showing the attachment in another orientation.

A lawn mower attachment 200 for controlling lateral discharge of clippings expelled from a discharge chute of lawn mower M according to another embodiment is best shown in FIGS. 7 and 8. Components of attachment 200 which are identical to components described above are identified with like reference numerals, and the description of same will not be repeated hereafter.

Attachment 200 includes flap 12 and support plate 102 which is attached to a longitudinal edge of flap 12. Support plate 102 includes first and second flanges 22, 24 extending outwardly proximate opposite ends thereof, which are pivotally attached to upper surface 36 of deck 14 via rod 44. Support plate 102 also includes end bracket 104, which preferably extends outwardly from support plate 102 on a plane substantially perpendicular to the plane of flap 12, as described above.

A bendable strap may be secured to flap 12, such as a steel strap, which may be easily bent to a selected angle so that flap 12 conforms to the discharge chute 16. The bendable strap may be secured to either the outer or inner surface of flap 12 via associated fasteners or adhesive. Alternatively, flap 12 may be formed of a bendable material, which may be bent by the user to conform to discharge chute 16. Such a strap may be desirable if discharge chute 16 is rounded or includes portions not substantially planar.

Pivotal movement of flap 12 is controlled via axial movement of a control rod 210. Control rod 210 includes a first end 212 coupled to end bracket 104. Preferably, first end 212 has a socket configuration. Pin 114 is provided, which includes a first end secured to end bracket 104, such as through a corresponding hole in end bracket 104 and with associated fasteners. Pin 114 includes a second end having a ball configuration which is rotatably retained within the socket configuration of first end 212. In this way, first end 212 is coupled to end bracket 104 via a ball and socket joint, thereby allowing limited rotational movement of pin 114 relative to control rod 210.

Control rod 210 includes an opposite second end 214 preferably disposed proximate the user, so that the user may easily grip second end 214 while operating lawn mower M. A ball 117 may be provided on second end 214 which acts as a handle, as described above.

Figure 9:
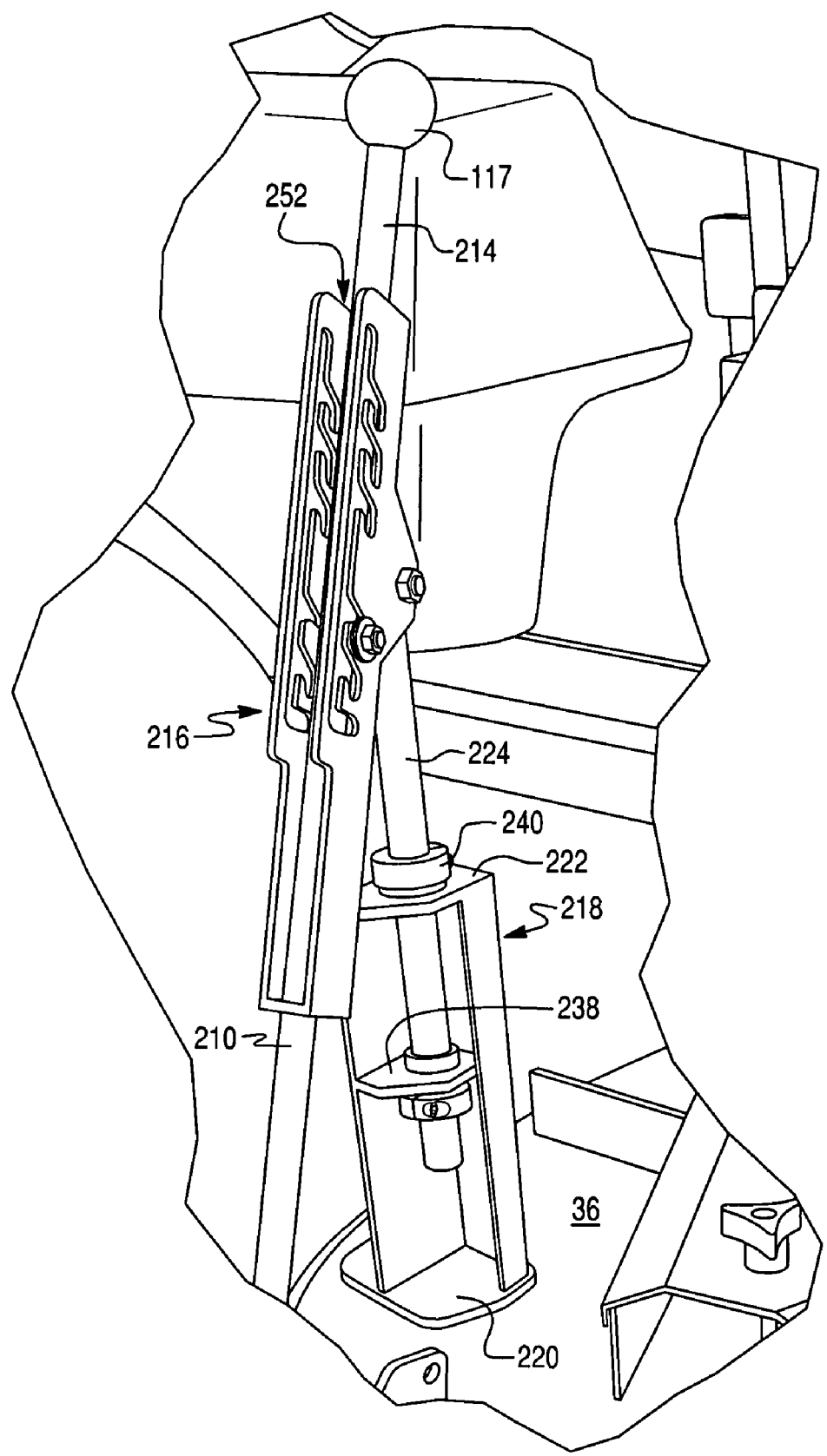
FIG. 9 is a fragmentary perspective view of a portion of the lawn mower attachment of FIG. 7.
Figure 10:
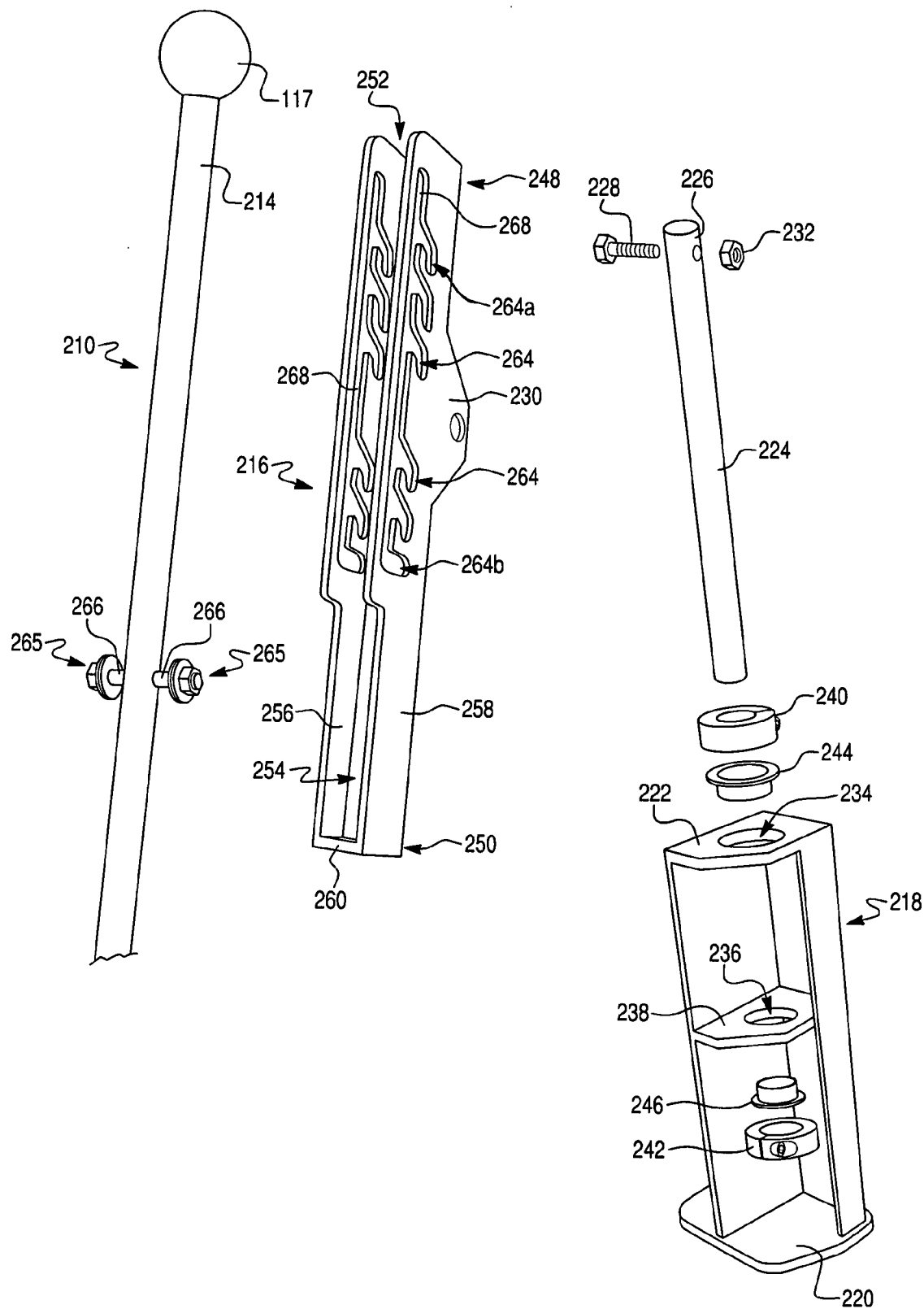
FIG. 10 is an assembly view of the portion of the lawn mower attachment shown in FIG. 9.

Attachment 200 includes a control bracket 216 connected to upper surface 36 of deck 14, preferably via a support strut 218. As best shown in FIGS. 9 and 10, support strut 218 includes first end 220 secured to upper surface 36, and a second end 222 coupled to control bracket 216. Preferably, a support shaft 224 is provided, which is slidably connected to support strut 218 so that an end of support shaft 224 is moveable toward and away from support strut 218. Control bracket 216 may be connected to a distal end 226 of support shaft 224. In this way, control bracket 216 is extendable away from or moveable towards upper surface 36 of the lawn mower M, thereby permitting a user to adjust the height of control bracket 216 relative to upper surface 36.

Preferably, control bracket 216 is pivotally connected to distal end 226 of support shaft 224. A bolt 228 or other pin may extend through holes provided in a central portion 230 of control bracket 216, and extend through an associated hole provided in distal end 226 of support shaft, so that control bracket 216 is pivotally disposed thereon. Bolt 228 may be retained in position via an associated nut 232 or some other conventional fastener.

Support strut 218 preferably includes a first opening 234 extending through second end 222, and a second opening 236 extending through a central plate 238 provided on support strut 218. Support shaft 224 extends through first and second openings 234, 236. A first collar 240 is secured around a central portion of support shaft 224. First collar 240 has a diameter greater than the diameter of first opening 234, so that first collar 240 contacts an upper surface of second end 222 of support strut 218, and thereby limits downward movement of support shaft 224 when disposed in support strut 218. A second collar 242 is provided having a diameter greater than the diameter of second opening 236. Second collar 242 is secured around support shaft 224 and spaced from first collar 240 such that second collar 242 contacts an underside of central plate 238, thereby limiting upward movement of support shaft 224 when disposed in support strut 218.

First and second collars 240, 242 preferably slide onto support shaft 224, and may be moveably clamped thereon at selected positions. For example, first and second collars may be one or two-piece clamping shaft collars, or collars having set screws. Other clamps or fasteners may also be used to limit upward and downward movement of support shaft 224 relative to support strut 218. However, first and second collars 240, 242 are preferably moveably securable to support shaft 224 at selected positions, so that distal end 226 of support shaft 224 is extendable away from or moveable towards upper surface 36 of the lawn mower M, and then securable at a selected position relative to support strut 218. In this way, the height of control bracket 216 relative to upper surface 36 may be adjusted.

Support shaft 224 is preferably rotatably disposed within first and second openings 234, 236. In this way, control bracket 216 is rotatable relative to upper surface 36. First and second bushings 244, 246 may be disposed within first and second openings 234, 236, respectively, which reduce friction and wear as support shaft 224 is rotated therein.

Control bracket 216 is preferably pivotally connected to support shaft 224, as noted above. Control bracket 216 includes a first end 248 and an opposite second end 250, and a channel 252 defined by a base 254 and first and second spaced sidewalls 256, 258 having a U-shaped configuration in section.

Second end 250 may include an end wall 260 having an opening through which control rod 210 extends, as shown in FIG. 9. Control rod 210 is slideably disposed within channel 252, so that ball 117 of control rod 210 may be pulled toward or away from control bracket 216. As ball 117 is pulled away from control bracket 216, first end 212 is lifted upwardly thereby pivoting a distal edge of flap 12 away from discharge chute 16, as shown in FIG. 8. As end bracket 104 on support plate 102 is pivoted to an open position, the connection point between pin 114 and end bracket 104 proceeds along an arcuate path. The ball and socket coupling between first end 212 and end bracket 104 via pin 114 account for this arcuate motion, thereby permitting upward movement of control rod 210 to translate into pivotal movement of support plate 102. Conversely, as ball 117 is pushed toward control bracket 216, first end 212 is pushed downwardly thereby pivoting the distal edge of flap 12 toward discharge chute 16 and into a closed position, as shown in FIG. 7.

Similar to control handle support bracket 56, control bracket 216 includes notches 264 disposed in spaced sidewalls 256, 258. First and second shafts 266 extend outwardly from a central portion of control rod 210, and are receivable in notches 264. Associated washers and nuts 265 may be provided to ensure that shafts 266 are retained within notches 264 and do not 'fall out' of notches 264. Shafts 266 may be removeably retained within corresponding notches 264, so that control rod 210 may be maintained in an axially selected position. In this way, flap 12 may be maintained at a selected angle relative to discharge chute 16.

Control rod 210 may be axially moved upwardly or downwardly relative to control bracket 216 when the user pulls or pushes ball 117 away from or toward first end 248 of control bracket 216. Upward movement of control rod 210 causes flap 12 to open. Preferably, flap 12 may be pivoted so that the distal edge of flap 12 subtends an angle of at least about 90°, more preferably an angle of about 180°, between a fully closed position and a fully open position.

The user may pull ball 117 and thus axially move control rod 210 a sufficient distance so that flap 12 is pivoted to a fully open position. Flap 12 may be maintained in the fully open position when shafts 266 are slid into and maintained in the uppermost notches 264a. Flap 12 may be maintained in a fully closed position when shafts 266 are slid into and maintained in the lowermost notches 264b. Control rod 210 may be releaseably maintained in other selected axial positions when shafts 266 are disposed within other notches 264 intermediate uppermost notches 264a and lowermost notches 264b. In this way, flap 12 may be maintained at a selected angle relative to discharge chute 16. Due to the weight of support plate 102, flap 12, and control rod 210, gravitational forces bias control rod 210 downwardly. Thus, flap 12 is biased toward a fully closed position unless control rod 210 is releaseably locked in a selected position as described above.

Sidewalls 256, 258 of control bracket 216 preferably include slots 268 extending parallel to channel 252. Notches 264 extend into the corresponding slots 268, so that the corresponding shafts 266 may be moved into and out of notches 264 and moved along slots 268. As shafts 266 are slid into or out of selected notches 264 from slot 268, the angle of the axis of control rod 210 relative to control bracket 216 may vary slightly. As described above, as end bracket 104 on support plate 102 is pivoted, the connection point between pin 114 and end bracket 104 proceeds along an arcuate path. The ball and socket coupling between first end 212 and end bracket 104 via pin 14 account for this arcuate motion, as well as angular variation of control rod 210 relative to end bracket 104. Upward movement of control rod 210 thereby translates into pivotal movement of support plate 102. The ball-and-socket attachment of control rod 210 to support plate 102 ensures a smooth operation of attachment 200.

Attachment 200 allows the user to selectively switch between a mulching mode when flap 12 is in a fully closed position, and discharging mode when flap 12 is in a fully open position. In addition, the user may selectively adjust the lateral distance that the clippings are discharged from discharge chute 16 by adjusting the angle at which flap 12 is disposed relative to discharge chute 16.

It will be apparent to one of ordinary skill in the art that various modifications and variations can be made in construction or configuration of the present invention without departing from the scope or spirit of the invention. Although the present invention has been described with reference to figures showing a riding lawn mower, the lawn mower attachments disclosed herein could easily be configured for attachment to a push mower. For example, a control support bracket and control block could be provided on the handle of a push mower. Moreover, although control handle 66 or ball 117 is preferably provided within relatively easy reach of the lawn mower operator, it may also be mounted on the mower deck and adjusted when the mower is idle or stopped. Further, the configurations of components such as the support and control brackets disclosed herein are exemplary only, and the present invention is not so limited. It would be readily apparent to one skilled in the art that modifications of the specific configurations could be made while still achieving the desired function. Thus, it is intended that the present invention cover all such modifications and variations, and as may be applied to the central features set forth above.

I claim:

1. A lawn mower attachment for controlling lateral discharge of clippings expelled from a discharge chute of a mover, comprising:
    a flap pivotably attached to a discharge chute of a lawn mower;
    a control bracket connected to an exterior surface of the lawn mower, said control bracket having a channel;
    a rod having a first end secured to said flap and a free second end extending outwardly from said channel, said rod extending through and slideably disposed within said channel so that said second end is moveable toward and away from said control bracket, wherein movement of said second end away from said control bracket pivots a distal edge of said flap away from said discharge chute, and movement of said second end toward said control bracket pivots said distal edge of said flap toward said discharge chute.

2. The lawn mower attachment of claim 1, further comprising a strut having a first end secured to said exterior surface of the lawn mower and distal second end, said control bracket connected to said distal second end of said strut.

3. The lawn mower attachment of claim 2, further comprising a shaft slidably connected to said strut so that an end of said shaft is moveable toward and away from said strut, said control bracket connected to said end of said shaft so that said control bracket is movable toward and away from said exterior surface of the lawn mower.

4. The lawn mower attachment of claim 3, wherein said control bracket is pivotally connected to said end of said shaft.

5. The lawn mower attachment of claim 3, wherein said shaft is rotatably connected to said strut so that said control bracket is rotatably coupled to said exterior surface of the lawn mower.

6. The lawn mower attachment of claim 3, wherein said strut includes a first opening disposed in said distal second end, said shaft slidably received in said first opening.

7. The lawn mower attachment of claim 6, further comprising a first collar secured around a central portion of said shaft, said first collar having a diameter greater than the diameter of said first opening in said distal second end so that said collar limits movement of said shaft in a downward direction.

8. The lawn mower attachment of claim 7, further comprising a second collar secured around said central portion and spaced from said first collar, said second collar limiting movement of said shaft in an upward direction.

9. The lawn mower attachment of claim 8, wherein said first and second collars are securable in selected positions along said shaft so that said shaft may be moveably secured in a selected position relative to said strut.

10. The lawn mower attachment of claim 6, wherein said strut includes a second opening disposed in a central plate on said strut, said shaft extending through said first and second openings.

11. The lawn mower attachment of claim 10, further comprising at least one collar adjacent one of said first and second openings, wherein said at least one collar has a diameter greater than the diameter of said first and second openings so that said at least one collar limits movement of said shaft relative to said strut.

12. The lawn mower attachment of claim 1, further comprising a bendable strap secured to said flap and bendable to selected angle so that said flap conforms to said discharge chute.

13. The lawn mower attachment of claim 1, wherein said first end of said rod is pivotably connected to said flap via a ball and socket connector.

14. The lawn mower attachment of claim 13, wherein a longitudinal edge of said flap is secured to a support plate, said support plate including an end bracket extending outwardly therefrom, said first end of said rod pivotally connected to said support plate via a pin associated with said ball and socket connector.

15. The lawn mower attachment of claim 1, wherein a longitudinal edge of said flap is secured to a support plate, said support plate having first and second spaced flanges pivotally connected to brackets on said exterior surface of the lawn mower so that said flap is pivotally connected thereto.

16. The lawn mower attachment of claim 1, wherein said control bracket includes a base and first and second sidewalls, said base and sidewalls having a U-shaped configuration and forming said channel.

17. The lawn mower attachment of claim 16, wherein at least said first sidewall includes a plurality of notches, said rod including at least one shaft extending outwardly from a central portion of said rod, said shaft removeably retained within a selected one of said plurality of notches so that said flap is disposed at a selected angle relative to said discharge chute.

18. The lawn mower attachment of claim 17, wherein said second sidewall includes a plurality of notches aligned with said plurality of notches in said first sidewall, said rod include first and second shafts extending outwardly from opposite sides of said central portion and removeably retained within corresponding selected notches in said first and second sidewalls.

19. The lawn mower attachment of claim 16, wherein said control bracket includes an opening disposed proximate an end thereof through which said rod extends.

20. The lawn mower attachment of claim 1, wherein a distal edge of said flap subtends an angle of at least about 90° between a fully closed position and a fully open position.

21. The lawn mower attachment of claim 20, wherein said distal edge of said flap subtends an angle of about 180° between a fully closed position and a fully open position.

* * * * *